(12) United States Patent
Goslin

(10) Patent No.: US 10,913,002 B2
(45) Date of Patent: Feb. 9, 2021

(54) JOINING GAMEPLAY OF A GAME THROUGH VIDEO CONTENT

(71) Applicant: Disney Enterprises, Inc., Burbank, CA (US)

(72) Inventor: Michael P. Goslin, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/014,747

(22) Filed: Jun. 21, 2018

(65) Prior Publication Data
US 2019/0388792 A1 Dec. 26, 2019

(51) Int. Cl.
*A63F 13/537* (2014.01)
*A63F 13/86* (2014.01)
*A63F 13/79* (2014.01)

(52) U.S. Cl.
CPC ............ *A63F 13/86* (2014.09); *A63F 13/537* (2014.09); *A63F 13/79* (2014.09)

(58) Field of Classification Search
None
See application file for complete search history.

(56) References Cited

U.S. PATENT DOCUMENTS

| | | | |
|---|---|---|---|
| 2002/0022520 A1* | 2/2002 | Oe | A63F 13/10 463/42 |
| 2007/0117635 A1* | 5/2007 | Spanton | A63F 13/12 463/43 |
| 2013/0178281 A1* | 7/2013 | Ayyar | A63F 13/12 463/30 |
| 2015/0297998 A1* | 10/2015 | Karamfilov | A63F 13/48 463/42 |
| 2016/0261647 A1* | 9/2016 | Yerli | H04L 51/32 |
| 2017/0006322 A1* | 1/2017 | Dury | H04N 21/254 |

OTHER PUBLICATIONS

Chris Stobing, How to Broadcast Your Games Online with Steam, www.howtogeek.com, Mar. 17, 2016; https://www.howtogeek.com/245658/how-to-broadcast-your-games-online-with-steam/ [retrieved from internet on Jun. 21, 2018].

* cited by examiner

*Primary Examiner* — Damon J Pierce
(74) *Attorney, Agent, or Firm* — Esplin & Associates, PC

(57) ABSTRACT

One aspect of this disclosure relates to facilitating players joining an ongoing game session depicted in video content for contemporaneous, interactive play with a player. A first user on a first computing platform may present a recording of video content to a second user on a second computing platform. The video content may include a depiction of a game session of a game and a pointer to the game session. The second user may access the pointer. The pointer may enable the second user to participate in the game session depicted in the video content.

16 Claims, 7 Drawing Sheets

US 10,913,002 B2

JOINING GAMEPLAY OF A GAME THROUGH VIDEO CONTENT

FIELD OF THE DISCLOSURE

The present disclosure relates to facilitating players joining an ongoing game session depicted in video content for contemporaneous, interactive play.

BACKGROUND

Live video streaming of gameplay of a game by a streamer is increasing in popularity. Viewers of a live video stream may engage in conversation with the streamer on a chat box located in proximity to the live video stream. A streamer may verbally communicate with the viewers.

SUMMARY

One aspect of this disclosure relates to facilitating a second user (e.g., a viewer) viewing video content on a second computing platform in joining a game session of a game depicted in the video content for contemporaneous, interactive play with a first user (e.g., streamer/broadcaster of the video content). The first user may be participating in the game session on a first computing platform. The video content may include a recording of gameplay of the game session. The recording of gameplay of the game session may be performed by the first user on the first computing platform. The recording may be presented live to other users (such as the viewer of a live stream/broadcast). The recording may be presented live to the other users by transmitting information defining the video content as the video content is captured by the first computing platform. A depiction of a pointer may be presented concurrently with the video content. The pointer may facilitate the second user joining the game session for contemporaneous, interactive play with the first user. The pointer may be associated with game information of the game session of the game and/or other information. The game information may define one or more of a game state, a user state, and/or other information about the game session in the video content. The game information may enable the second user viewing the video content to join the game session presented on the video content. The viewer may join the same game session and participate in game activities with the first user. The depiction of the pointer may be presented concurrently with the video content when the second user satisfies a set of pointer criteria.

In some implementations, a system configured to facilitate users joining an ongoing game from video content may include one or more of one or more servers, one or more computing platforms, one or more external resources, and/or other components. Users may access the system via the computing platforms and/or other devices. In some implementations, the server(s) may include one or more of electronic storages, one or more physical processors, and/or other components. In some implementations, the one or more physical processors may be configured by machine-readable instructions. Executing the machine-readable instructions may cause the one or more physical processors to facilitate users joining an ongoing game session depicted in video content. The machine-readable instructions may include one or more computer program components. The one or more computer program components may include one or more of a broadcasting component, a presentation component, an input component, a determination component, an effectuation component, and/or other components.

The broadcasting component may be configured to obtain game session information and/or other information. The game session information may include video information, pointer information, and/or other information. The video information may define video content and/or other information. The video content may be a live video content (e.g., a live stream and/or live broadcast), a video clip (e.g., a replay of a video file of the video content), and/or other video content. The video content may include a depiction of gameplay in a game session of a game and/or other content. The video content may be captured by a first user (e.g., a streamer) on a first computing platform and/or other devices. The pointer information may define a pointer and/or other information. The pointer may be associated with game information, a progress length, and/or other information. The game information may include one or more of a game state, a user state, and/or other information of the game session and/or the game. The pointer may enable a second user (e.g., a viewer) associated with a second computing platform to join the game session for contemporaneous, interactive play with the first user. The pointer may present an offer for the second user to join the game session for contemporaneous, interactive play with the first user. A set of pointer criteria may determine when the pointer may be presented.

The presentation component may be configured to effectuate presentation of the video content and/or other information. The presented video content may be based on the video information and/or other information. The video content may be presented on the second computing platform and/or other computing platforms. The presentation component may be configured to effectuate presentation of the pointer concurrently with the presentation of the video content. The pointer may be embedded in the video content. The presentation component may effectuate presentation of the pointer concurrently with the presentation of the video content when one or more criteria of the set of pointer criteria may be satisfied.

The input component may be configured to obtain user input information defining user input and/or other information. The user input information may define user input from the first user, the second user, and/or other users. The user input from the first user may include an instruction to enable the presentation of the pointer and/or other instructions. The user input from the second user may include an instruction for attempting to satisfy the set of pointer criteria, an instruction for accepting the offer to join the game session depicted in the video content, and/or other instructions. The input component may obtain input information defining the first user input from the first computing platform, input information defining the second user input from the second computing platform, and/or other input information defining the other user inputs from the other computing platforms.

The determination component may be configured to determine whether one or more criteria of the set of pointer criteria has been satisfied. The determination component may be configured to determine whether the set of pointer criteria has been satisfied based on user information, the user input information, and/or other information. The determination component may determine whether the user inputs satisfy the set of pointer criteria by comparing the user information, the user input information, and/or other inputs with the set of pointer criteria. The determination component may be configured to determine whether the set of pointer criteria has been satisfied based the user information and/or other information. The user information may specify information of a user account and/or other information. The user account may include a user account of the first user, the second user, and/or other users. Responsive to the satisfaction of the set of pointer criteria, the determination component may enable the presentation of the pointer concurrently with the video content.

The effectuation component may be configured to facilitate execution of an instance of the game session on the second computing platform and/or other computing platforms. Responsive to the second user accepting the offer to join the game session presented by the pointer, the effectuation component may be configured to facilitate execution of the instance of the game session on the second computing platform. The instance of the game session on the second computing platform may enable the second user to join the game session of the game for contemporaneous, interactive play with the first user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the invention. As used in the specification and in the claims, the singular form of "a," "an," and "the" include plural referents unless the context clearly dictates otherwise.

DETAILED DESCRIPTION

Figure 1:
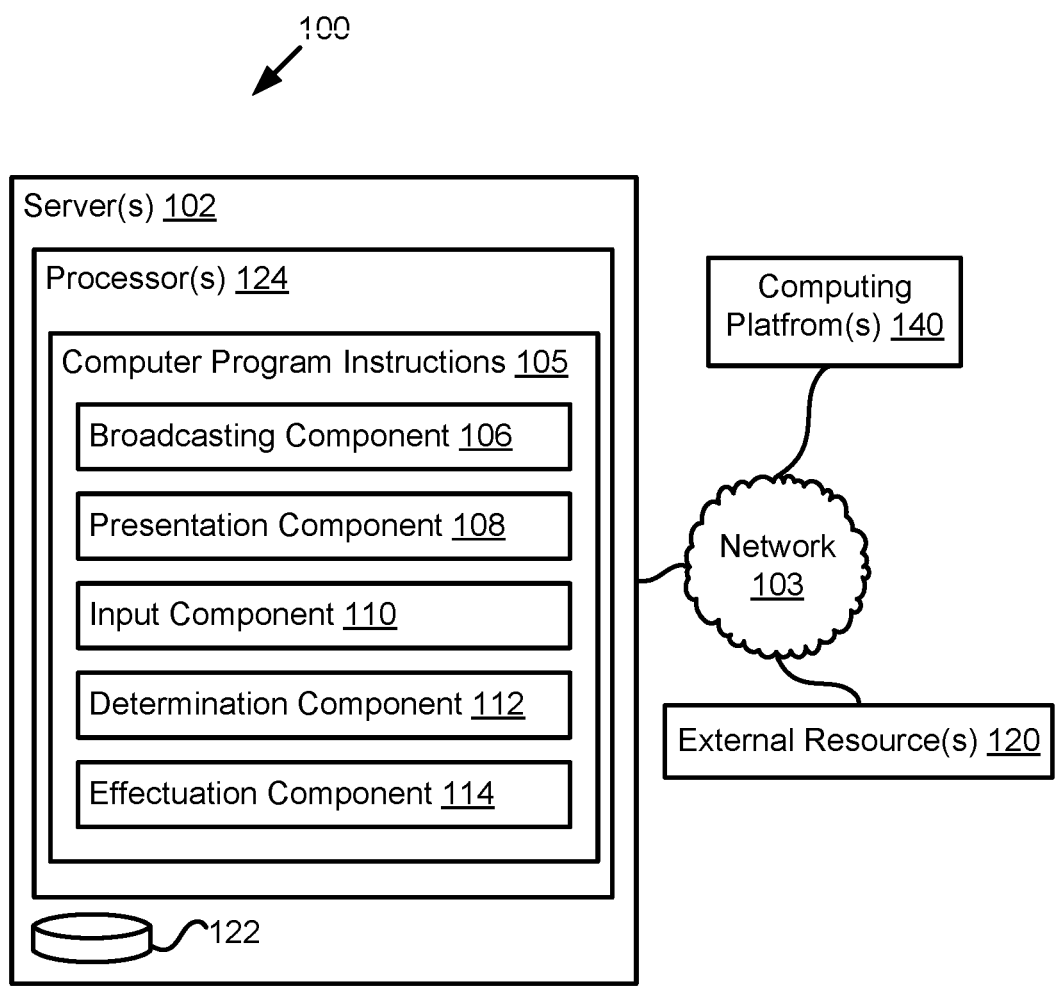
FIG. 1 illustrates a system configured to facilitate users joining an ongoing game depicted in video content, in accordance with one or more implementations.

FIG. 1 illustrates a system 100 configured to facilitate users joining an ongoing game depicted in video content. The video content may be recorded on a first computing platform associated with a first user and/or streamed live from the first computing platform associated with the first user. The video content may include a depiction of gameplay of a game session of the game and/or other content. The first user may be participating in the game session of the game on the first computing platform. The game session may include a first virtual entity associated with the first user and/or other virtual objects. The first virtual entity may be controlled by the first user and/or other users. The video content may be viewed by a second user on a second computing platform associated with the second user. A pointer may be presented concurrently with the video content. The pointer may include and/or may be associated with information that may enable the second user to join the game session of the game depicted in the video content for contemporaneous, interactive play with the first user. A second virtual entity associated with the second user may be presented in the game session. The second user entity may be controlled by the second user and/or other users. The second user may participate in the game session by controlling the second user entity and/or other virtual objects.

As is illustrated in FIG. 1, system 100 may include one or more servers 102, one or more computing platforms 140, one or more external resources 120, and/or other components. Users may access system 100 via computing platform(s) 140 and/or other devices. Users may communicate with server(s) 102 via computing platform(s) 140 and/or other devices. Server(s) 102 and/or computing platform(s) 140 may access external resource(s) 120 and/or other components of system 100.

Computing platform(s) 140 may be one or more of a mobile computing device (such as one or more of a smartphone, smartwatch, etc.), a personal computer, a network of computers, a wearable computing device (such as a head-mounted computing device), a game console, and/or other computing platforms. The head-mounted computing device may be a virtual reality headset and/or augmented reality headset. Computing platform(s) 140 may include one or more of one or more input devices, one or more displays, one or more sensors, one or more audio output devices, and/or other components. It is noted that computing platform(s) 140 may represent an individual computing platform and/or more than one computing platform that may be similarly configured as described herein.

Computing platform(s) 140 may include the first computing platform associated with the first user, the second computing platform associated with the second user, and/or other computing platforms associated with other users. Computing platform(s) 140 may be configured to facilitate gameplay of a game, recording of video content, viewing the recording of the video content and/or other content, and/or other perform functions. The game may be a video game including one or more of an online game, an offline game, a single player game, a multiplayer game, a local co-op game, and/or other games. The game may include a virtual reality game including virtual reality content, an augmented reality game including augmenting reality content, and/or other content.

Computing platform(s) 140 may facilitate gameplay of the game by effectuating presentation of a game session of the game. The game session of the game may be presented on computing platform(s) 140 and/or other devices. The game session of the game may be presented on a display of computing platform(s) 140 and/or other devices. Computing platform(s) 140 may facilitate gameplay of the game by obtaining user input specifying user instructions for the game session of the game. The user instructions may control game elements that make up the game session of the game.

The game session may include preprogrammed instructions for reacting to the user input and/or other information. The game session may include one or more virtual objects positioned throughout the topography of a simulated physical space of the game session. The virtual objects may include one or more of one or more virtual entities, one or more virtual structures, and/or other virtual objects. The game session may be hosted on a game server (for example, server(s) 102), computing platform(s) 140, and/or other devices.

The simulated physical space may be in a three-dimensional space, two-dimensional space, and/or other simulated physical spaces. The simulated physical space may depict a virtual environment of a game session of a game. The virtual objects and/or the simulated physical space may be part of a virtual reality content, an augmented reality content, and/or other content. In some implementations, the simulated physical space may make up the environment of the virtual reality content, the augmented reality content, and/or other content.

A virtual entity may include a depiction of a character/avatar, a group of characters/avatars, a vehicle, and/or other entities. In some implementations, the character/avatar and/or group of characters/avatars may occupy/ride the vehicle. The character/avatar may be a depiction of a fictional character and/or a real-world character. The vehicle may be one or more of a motorized vehicle, flying vehicle, and/or vehicles. The virtual entity may be controlled by a user, preprogrammed behaviors, an artificial intelligence, and/or other controlling systems and/or entities.

A virtual structure may include a depiction of a building, a store, a landmark, and/or other virtual structures. In some implementations, the virtual structure may be a representation of a real-world structure. In some implementations, the virtual structure may be a virtual-world structure. In some implementations, the virtual structure may include the virtual entity, and/or other virtual content. For example, the virtual entity may be within and/or occupy the virtual structure.

Virtual objects may be static or dynamic. For example, the virtual objects may be positioned in a fixed location (e.g., static) or move about locations in the topography of the simulated physical space (e.g., dynamic). In some implementations, the virtual structures and/or virtual entities may be static. In some implementations, the virtual entities may be dynamic. In some implementations, the virtual structures may be static, and the virtual entities may be dynamic.

The video content may be defined by video information and/or other information. The video content may be one or more videos, video clips, and/or other video content. Video content may be stored in one or more formats/containers. A format may refer to one or more ways in which the information defining video content is arranged/laid out (e.g., file format). A container may refer to one or more ways in which information defining video content is arranged/laid out in association with other information (e.g., wrapper format).

Video content may include a video clip captured by computing platform(s) 140 and/or multiple video clips captured by computing platform(s) 140. In some implementations, multiple video clips may be captured by multiple components of computing platform(s) 140. For example, different video clips may be captured by different components of computing platform(s) 140. Video content may include multiple video clips captured at the same time and/or multiple video clips captured at different times. Video content may include a video clip processed by a video application, multiple video clips processed by a video application, and/or multiple video clips processed by different video applications. Video content may be captured by one or more image capture devices during one or more capture durations.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other progress lengths, time durations, and frame numbers are contemplated. The progress length may include a starting point in time defining the start of the video content and an ending point in time defining the end of the video content.

Video content may define visual and/or audio content that may be consumed as a function of progress through the progress length of the video content. To consume the video content may include viewing the video content and/or accessing it in other ways. Video content may include video frames that define visual content. For example, the visual content of the video content may be included within video frames of the video content. The video frames may correspond to different points in time within the progress length. The video content may include virtual reality content, augmented reality content, and/or other content.

The recording of the video content may include capturing of visual and/or audio content presented on computing platform(s) 140 and/or other devices. The visual and/or audio content captured from computing platform(s) 140 may include visual content presented on the display of computing platform(s) 140, audio content presented on audio output devices of computing platform(s) 140, audio content captured from audio input devices (e.g., an audio sensor) of computing platform(s) 140, and/or other content. The recording of the video content may include a depiction of the game session of the game, the users participating in the game session of the game, and/or other content.

The recording of the video content may be transmitted to server(s) 102 and/or other servers for broadcasting and/or storage. The video content (such as a video clip) may be stored in electronic storage(s) 122 and/or other storage locations. The video content (such as live video content) may be broadcasted live and/or transmitted in real-time while recording the video content to computing platform(s) 140 such that the video content may be viewable on computing platform(s) 140. The video content (such as the video clip) may be accessed by computing platform(s) 140 such that the video content may be viewable on computing platform(s) 140.

In some implementations, computing platform(s) 140 may obtain and/or generate game session information and/or other information. The game session information may include the video information, pointer information, and/or other information. The pointer information may define a pointer to the game session depicted in the video content. The pointer may be associated with game information and/or other information. The game information may define one or more of a game state, a user state, and/or other information about the game session. The game state, the user state, and/or other information may identify the game session and/or the game.

The pointer information may include a set of pointer criteria for determining when the pointer may be presented concurrently with the video content. The game session information may enable other computing platforms to view the video content, join the game session depicted in the video content, and/or join the game session for contemporaneous, interactive play with a user. The game session information may be transmitted to server(s) 102 for broadcasting and/or transmission to other computing platforms and/or storage. The game session information may be stored in electronic storage(s) 122 and/or other storage locations.

In some implementations, the first user may be participating in a game session of a game on the first computing platform and/or other devices. The game session may be hosted on a first game server and/or other devices. The first user may capture video content of gameplay of the game session of the game with the first computing platform and/or other devices. The recording of the video content may be defined by video information and/or other information. The recording of the video content may be broadcasted to other computing platforms and/or devices. The video information defining the recording of the video content may be transmitted to server(s) 102 for broadcasting to other computing platforms and/or devices. The recording of the video content may be broadcasted to other computing platforms and/or devices in real-time or near real-time while the video content may be captured. Video information defining the recording of the video content (such as a video clip) may be uploaded to server(s) 102 and storage in electronic storage(s) 122 and/or other storage locations. The video content stored in electronic storage(s) 122 may be accessed by other users on other computing platforms associated with the other user. The other users may view the video content by accessing the video information from server(s) 102, electronic storage(s) 122, and/or other devices.

In some implementations, the first computing platform may obtain and/or generate game session information and/or other information. The first computing platform may transmit game session information to server(s) 102 for broadcasting and/or transmission to other computing platforms and/or storage. The game session information may be stored in electronic storage(s) 122 and/or other storage locations. The game session information may be transmitted from the first computing platform for broadcasting and/or transmission to other computing platforms. The game session information may enable other computing platforms to view the video content, join the game session depicted in the video content, and/or join the game session for contemporaneous, interactive play with the first user.

The second computing platform may be configured to obtain the game session information and/or other information. The second computing platform may be configured to obtain the game session information from server(s) 102, the first computing platform, and/or other devices. The second user may view the recording of the video content from the second computing platform and/or other devices. The second user may view the recording of the video content from the second computing platform and/or other devices based on the game session information and/or other information. The game session information including the video information may enable the second computing platform to effectuate presentation of the video content and/or other content. The game session information including the pointer information may enable the second user to join the game session depicted in the video content.

The game session information including the pointer information may enable the execution of the game session on the second computing platform such that the second user may join the game session. The game session information including the pointer information may enable the execution of the game session on the second computing platform such that the second user may join the game session for contemporaneous, interactive play with the first user. Contemporaneous play with the first user comprises of joining the same game session as the first user and/or participating the game session with the first user in other ways. Joining the same game session as the first user may include joining the first game server hosting the game session of the first user. Interactive play with the first user comprises of participating in the same game activity in the game session with the first user, cooperating in a game activity in the game session with the first user, and/or interacting between the first user and the second user in the game session in other ways.

The input devices of computing platform(s) 140 may include one or more of a computer mouse, a keyboard, a game controller, a touch-enabled input device, an imaging device, and/or other input devices. The input devices may be removably coupled to computing platform(s) 140. The input devices may be integrated with computing platform(s) 140.

The touch-enabled input device may be a touch screen and/or other devices. The touch screen may include one or more of a resistive touchscreen, a capacitive touchscreen, a surface acoustic wave touchscreen, an infrared touchscreen, an optical imaging touchscreen, an acoustic pulse recognition touchscreen, and/or other touchscreens. The touch-enabled input device may be configured to generate output signals conveying touch gesture information defining touch gesture inputs of the user.

The imaging device may include one or more image sensors, infrared sensors, depth sensors, and/or other sensors for imaging. The imaging device may be configured to generate output signals conveying visual information defining visual content. The video content may include a depiction of a user and/or an environment surrounding the user. The visual content of the user may include movements made by the user. The visual content may be a video/video clip. An imaging device may be a camera or a series of cameras.

The displays may be a device configured to effectuate presentation of visual content. The displays include one or more of a touch-enabled display (e.g., the touchscreen), an LCD display, a LED display, an OLED display, a projector, and/or other displays. In some implementations, the display may be a video projector and/or other devices.

The sensors of computing platform(s) 140 may include one or more image sensors, audio sensors, and/or other sensors. The audio output devices for computing platform(s) 140 may be one or more of a speaker, a headphone, an earbud, and/or other audio output devices.

In some implementations, an image sensor may be configured to generate output signals conveying visual information and/or other information. The visual information may define visual content within a field of view of the image sensor and/or other content. The visual content may include depictions of real-world objects and/or surfaces. The visual content may be in the form of one or more of images, videos, and/or other visual information. The field of view of the image sensor may be a function of a position and an orientation of a computing platform. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other devices.

In some implementations, an audio sensor may be configured to generate output signals conveying audio information and/or other information. The audio information may define audio from a user of the audio sensor (e.g., utterances of the user), audio around the user (such as ambient audio), and/or other information. In some implementations, an audio sensor may include one or more of a microphone, a micro-electro-mechanical microphone, and/or other devices.

Server(s) 102 may include one or more of electronic storage(s) 122, one or more physical processors 124, and/or other components. In some implementations, processor(s) 124 may be configured by machine-readable instructions 105. Executing machine-readable instructions 105 may cause processor(s) 124 to facilitate users joining an ongoing game depicted in video content. Machine-readable instructions 105 may include one or more computer program components. The one or more computer program components may include one or more of a broadcasting component 106, a presentation component 108, an input component 110, a determination component 112, an effectuation component 114, and/or other components.

Broadcasting component 106 may be configured to obtain game session information and/or other information. Broadcasting component 106 may be configured to obtain game session information and/or other information from computing platform(s) 140, external resource(s) 120, and/or other devices. The game session information may be stored in electronic storage(s) 122 and/or other storage locations. The game session information may include video information, pointer information, and/or other information. The video information may define video content and/or other information. The video content may be captured by computing platform(s) 140 (e.g., the first computing platform) and/or other devices. The pointer information may define a pointer, a set of pointer criteria, and/or other information.

The video content may be a recording of visual and/or audio content from computing platform(s) 140 and/or other devices. The video content may be a recording of visual and/or audio content presented on the display of computing platform(s) 140 and/or other devices. For example, the video content may be the recording visual and/or audio content of gameplay of the game session of the game presented on the first computing platform and/or other devices. The visual content may include a depiction of the game session of the game, users participating in the game session, and/or other content. The depiction of the game session of the game may include a depiction of one or more virtual objects positioned throughout the topography of a simulated physical space of the game session. The depiction of the users participating in the game session of the game may include a depiction of virtual entities associated with the users participating in the game session. The audio content may include audio signals associated with the game session of the game, audio signals associated with the user, and/or other audio signals. The audio signals associated with the user may include the user speaking one or more words and/or other audio signals.

The video content may be live video content, a video clip (e.g., a replay of a recording of video content), and/or other video content. The live video content may be a live stream, live transmission, and/or live broadcast of the video content recorded by computing platform(s) 140. For example, the live video content may be a live stream, live transmission, and/or live broadcast of the video content recorded by the first computing platform to other computing platforms (such as the second computing platform). The live video content may be recorded by the first computing platform and received by the second computing platform in real-time or near real-time.

The video clip may be audio and/or visual content recorded by computing platform(s) 140 (such as the first computing platform) and/or other computing platforms. Video information defining the video clip may be stored in electronic storage(s) 122 and/or other storage location and/or medium. The video clip may be accessed and/or viewed through computing platforms(s) 140 (such as the second computing platform).

The video clip may include a progress length and/or other information. The video clip may define visual content viewable as a function of progress through the progress length of the video clip. The visual content of the video clip may be included within video frames of the video clip. The progress length may include a starting point defining the start of the video clip and an ending point defining the end of the video clip. A user may view the video clip at any point in time between the starting point and ending point.

The pointer may identify the game session depicted in the video content. The pointer may enable a user (such as the second user) to join the game session depicted in the video content, a different game session of the game depicted in the video content, and/or a copy of the game session of the game depicted in the video content. The pointer may identify users (such as the first user) participating in the game session. The pointer may enable users (such as the second user) to join the users (such as the first user) participating in the game session.

For example, the pointer may identify the first user and/or other users in the game session. The first user and/or the other users may be participating in the game session. The pointer may enable the second user to join the first user and/or the other users in the game session. The second user may join the first user and/or the other users in the game session for contemporaneous, interactive play with the first user and/or the other users. The information identified by the pointer may enable the second user to join the first user and/or the other users in the game session for contemporaneous, interactive play with the first user and/or the other users.

The pointer may be associated with game information, the progress length, and/or other information. The pointer may provide the user with means to join the game session of the game and/or a different game session of the game. For example, the game state, the user state, the progress length, and/or other information associated with the pointer may enable a user (such as the second user) to join the game session, the different game session of the game, and/or the copy of the game session of the game. The game state, the user state, the progress length, and/or other information of the game session and/or recording of the game session of the game may include information identifying the game session for a user (such as the second user) to join and/or the different game session of the game for the user to join. The pointer may identify the game session by identify the game, a game server hosting the game session of the game, and/or a location within the topography of simulated physical space of the game, and/or other information.

The game state may include information defining the game session, the game, and/or other information. The game state may define one or more of a set of game criteria for completing the game session, the game criteria satisfied, game behaviors, game appearances, game progress, and/or other elements of the game session. The user state may include information defining one or more users (such as the first user) of the game session, one or more virtual objects associated with the user (e.g., objects held in an inventory of the user), and/or other information. The user state may specify one or more of a user account, a user game status, a user location, and/or other information. The user account may be associated with users associated with and/or participating in the game session and/or the game. The user state may be associated with user information and/or other information.

The set of game criteria for completing the game session may include one or more criteria for progressing in the game session, one or more criteria for ending/finishing in the game session, and/or other criteria. The number of criteria in the set of game criteria satisfied may indicate a progress of the game session. The set of game criteria may be predetermined. Progression in the game session may include moving on to a new level in the game session, being able to access a new area in the simulated physical space of the game session, being able to access different virtual objects in the game session, being able modify a virtual entity associated with the user, and/or other forms of progression. Virtual objects associated with a user may be referred to as a user objects.

The game behaviors may specify how game elements interact with one another, how the game elements react to events and occurrences in the game session, and/or other interactions of the game elements. The game elements may be elements that make up the game session. The game elements may include the virtual objects, the simulated physical space, and/or other elements that make up the game session. The game element behaviors may specify how virtual objects interact with other virtual objects, the user objects, and/or other entities. For example, the game element behaviors may specify whether the virtual objects react in a hostile or friendly matter toward the user objects. In some implementations, the game element behaviors may specify whether the virtual objects react in a hostile or friendly matter toward the user objects for traversing across the area within the topography of the simulated virtual space. The game element behaviors may specify areas within the topography of the simulated virtual space the virtual objects may or may not traverse.

The game appearance may specify one or more graphical qualities of the game session, appearance of the game elements, and/or other features of the game session of the game. The graphical qualities of the game session may include one or more of a resolution quality, shadow quality, and/or other graphical qualities of the game session. The appearance of the game elements may include the physical appearance of the virtual objects, the virtual structures, and/or other content of the game session. For example, the physical appearance of the virtual objects may include a style of clothing worn by the virtual entities, the size of the virtual objects, and/or other physical appearances of the virtual objects. The appearance of the simulated physical space may define the depiction of the environment that make up the game session of the game.

The game progress may specify the progress of the game session of the game, the progress of the game session in the video content of the recording of the game session, and/or other information. The progress of the game session may be defined by the number of criteria in the set of game criteria satisfied, time spent in the game session, a level achieved in the game session, a percent of completion of the game session, a level of difficulty achieved of the game session, and/or other elements that define the progress of the game session. In some implementations, the game progress may specify a level in the game session achieved by the user participating in the game session.

User information may specify information of a user account and/or other information. The user account may include a user account of the first user, the second user, and/or other users. The user account may include identification information, user history information, a user game status, and/or other information. The identification information may identify the users, virtual objects associated with the users, virtual objects owned by the users, contact information of the users (e.g., an email and/or screen name), and/or other information. The identification information may identify the users in the real world and/or a virtual world. The user history information may include purchase history, travel history, Internet browsing history, conversation history, and/or other information of the users. The user history information may be a user's history in the real world and/or the virtual world.

The user game status may specify the users' activity in the game session. For example, the user game status may indicate whether a user may be engaged in the game session, not engaged in the game session, waiting to participate in the game session, seeking help from another user in or out of the game session, and/or other game statuses. The user game status may indicate activities the user may be engaged in. For example, the user game status may indicate whether the user is in a participating in an activity of the game session, in a lobby, and/or user game status.

The user location may indicate the location of the user in the game. The user location may specify an area and/or location of one or more virtual objects associated with the user in the topography of the simulated physical space of the game session. The user location may indicate a game server that may be hosting the game session. The game server may be identified by an Internet protocol address, regional code, and/or other identifiers.

The pointer may present an offer for a user to join the game session of the game. Responsive to an acceptance of the offer being received, the pointer may enable the presentation of an instance of the game on computing platform(s) 140. The instance of the game may include the game session. For example, the pointer may present an offer for the second user to join the game session of the first user's game. Responsive to the second user accepting the offer, the second user is enabled to join the game session of the first user's game. Responsive to the second user accepting the offer, the pointer may enable the execution of an instance of the game on the second computing platform. The instance of the game on the second computing platform may include the game session.

The pointer including the presentation of the offer may be depicted by a graphical user interface and/or other visual content in the video content. The graphical user interface may be one or more of a hyperlink, widget, and/or other graphical interfaces. The pointer may be a virtual object positioned in the topography of the simulated physical space. A user may interact with the virtual object and/or the graphical user interface to accept the offer. Acceptance of the offer may provide the computing platform(s) 140 with access to the pointer information.

The pointer may be presented concurrently with the video content. A depiction of the pointer may be presented concurrently with the video content. The depiction of the pointer may be presented concurrently with the video content presented on computing platform(s) 140. For example, the depiction of the pointer may be presented concurrently with the video content broadcasted by the first computing platform. The depiction of the pointer may be presented in the video content and/or an around the video content. The pointer may be embedded in the video content. For example, the depiction of the pointer may be part of the visual content of the video content.

The offer for the user to join the game session of the game include an offer to join the game session of another user, an offer to join the game session for contemporaneous, interactive play with the other user, an offer to join the game in a different game session, an offer to join the game in a copy of the game session, and/or other offers. The pointer may enable the user with the offer to join the game session of the other user, join the game session for contemporaneous, interactive play with the other user, join the game in the different game session, join the game in the copy of the game session, and/or accept other offers. For example, the pointer may enable the second user with the offer to join the game session of the first user for contemporaneous, interactive play with the first user.

The set of pointer criteria may determine when the pointer may be presented on computing platform(s) 140 (such as the second computing platform). The pointer may be presented to computing platform(s) 140 when one or more the criteria of the set of pointer criteria are satisfied. The set of pointer criteria may be predetermined, determined by a user, and/or determined by a third-party application. Criteria of the set of pointer criteria may require completion of one or more tasks and/or for one or more events to occur.

The criteria of the set of pointer criteria may require completion of one or more tasks at a predetermined time and/or for one or more events to occur at a point in time. The tasks may require a user to participating in one or more activities and/or perform one or more actions. For example, the tasks may require a user to make a purchase of an item and/or membership, complete a survey, and/or watch an advertisement. The events may be a real-world event, a virtual world event, and/or other events. A real-world event may be an occurrence that takes place in the real world. For example, a real-world event may be a holiday, a concert, a change of season, a particular weather, an appointment date, and/or other real-world events. The virtual-world event may be an occurrence that takes place in the virtual world. For example, the virtual-world event may be an in-game event and/or other virtual-world events.

For example, the set of pointer criteria may include one or more criteria requiring a user to have one or more of a paid or non-paid membership and/or subscription, a registered account, make payment of a fee make a purchase of an item, view the video content for a duration of time, watch an advertisement, complete a survey, make a comment in a chat box, a minimum experience level of a user entity, a minimum level of progress of the user entity, a maximum level of experience of the user entity, and/or a maximum level of progress of the user entity. The user may include a user who may be participating in the game session (e.g., the first user) and/or a user who intends to join the game session (e.g., the second user). The user entity may be the first user entity associated with the first user, the second user entity associated with the second user, and/or other user entities associated with other users.

Presentation component 108 may be configured to effectuate presentation of the video content and/or other information. Presentation component 108 may be configured to effectuate presentation of the video content based on the game session information and/or other information. Presentation component 108 may be configured to effectuate presentation of the video content on computing platform(s) 140 (such as the second computing platform) by transmitting the game session information and/or other information to computing platform(s) 140. In some implementations, presentation component 108 may determine when to present the video content based on the game session information and/or other information. In some implementations, presentation component 108 may determine who to the present the video content based on the game session information and/or other information. For example, presentation component 108 may present the video content to users associated with the game session depicted in the video content. The user associated with the game may be defined by the game session information and/or other information (such as the user information).

In some implementations, presentation component 108 may be configured to effectuate presentation of the video content based on the video information and/or other information. The video information may define the audio and/or visual content of the video content for presentation component 108 to present. The video information may define how presentation component 108 present the video content. For example, video information may define the graphical quality for presentation component 108 to present the video content. The video information may define whether presentation component 108 should present the video content as an augmented reality content, virtual reality content, and/or regular video content. Presentation component 108 may be configured to effectuate presentation of the video content on computing platform(s) 140 (such as the second computing platform) and/or other devices. Presentation component 108 may be configured to effectuate presentation of the video content on the display of computing platform(s) 140. Presentation component 108 may be configured to effectuate presentation of the video content on more than one computing platform(s) 140 contemporaneously in time. Presentation component 108 may be configured to effectuate presentation of the video content on more than one computing platform(s) 140 at different times. For example, presentation component 108 may be configured to effectuate presentation of the video content on a display the second computing platform and/or other computing platforms contemporaneously in time and/or at different times.

Presentation component 108 may be configured to effectuate presentation of the video content including the live video content, the video clip, and/or other video content. Presentation component 108 may be configured to effectuate presentation of the live video content when game session information is obtained from computing platform(s) 140 and/or other devices. For example, presentation component 108 may be configured to effectuate presentation of the live video content on the second computing platform when game session information is obtained from the first computing platform. Presentation component 108 may be configured to effectuate presentation of the live video content such that the second user of the second computing platform may view the live video content as the live video content is recorded on the first computing platform in real-time or near real-time.

Presentation component 108 may be configured to effectuate presentation of the video clip by providing computing platform(s) 140 with access to the game session information defining the video content of the video clip. Presentation component 108 may provide computing platform(s) 140 with access to the game session information stored in electronic storage(s) 122 and/or other storage locations. Presentation computing may provide computing platform(s) 140 with access to the game session information by transmitting the game session information to computing platform(s) 140. The game session information may enable computing platform(s) 140 to view the video content.

For example, presentation component 108 may be configured to effectuate presentation of the video clip by providing the second computing platform with access to the game session information defining the video content of the video clip. Presentation computing may provide the second computing platform with access to the game session information stored in electronic storage(s) 122 and/or other storage locations. Presentation computing may provide the second computing platform with access to the game session information by transmitting the game session information to the second computing platform. The game session information may enable the second computing platform to view the video content.

Presentation component 108 may be configured to effectuate presentation of the video content including the game sessions of the game. Presentation component 108 may be configured to effectuate presentation of the video content including the first user participating the game session of the game. Presentation component 108 may be configured to effectuate presentation of the video content including the one or more virtual objects positioned throughout the topography of the simulated physical space. Presentation component 108 may be configured to effectuate presentation of the video content including the one or more virtual objects including virtual entities associated with the users positioned throughout the topography of the simulated physical space. The virtual entities associated with the users may include the first virtual entity associated with the first user, the second virtual entity associated with the second user, and/or the other virtual entities associated with the other users.

Presentation component 108 may be configured to effectuate presentation of the pointer concurrently with the presentation of the video content and/or other content. Presentation component 108 may be configured to effectuate presentation of the pointer based on the game session information and/or other information. Presentation component 108 may be configured to effectuate presentation of the pointer on a computing platform (such as the second computing platform) by transmitting the game session information and/or other information to the computing platform. In some implementations, presentation component 108 may determine when to present the pointer based on the game session information and/or other information. In some implementations, presentation component 108 may determine who to the present the pointer based on the game session information and/or other information. For example, the presentation component 108 may present the pointer to users associated with the game depicted in the video content. The user associated with the game may be defined by the game session information and/or other information (such as the user information). In some implementations, presentation component 108 may determine where to the present the pointer in the video content based on the game session information and/or other information. For example, the presentation component 108 may determine to present the pointer in the video content as a part of the virtual object in the game session of the game depicted in the video content based on the game session information.

In some implementations, presentation component 108 may be configured to effectuate presentation of the pointer based on the pointer information and/or other information. Presentation component 108 may be configured to effectuate presentation of the pointer defined by the pointer information and/or other information. In some implementations, presentation component 108 may be configured to effectuate presentation of the pointer including the game information and/or other information. Presentation component 108 may be configured to present the pointer specifying a game session and/or a game with the game information. For example, presentation component 108 may be configured to present the pointer with the game information including one or more of the game state, the user state, and/or other information. Presentation component 108 may be configured to present the pointer including the progress length of the video content and/or other information. Presentation component 108 may be configured to present the pointer with the game information associated with the pointer such that a user (such as the second user) on computing platform(s) 140 (such as the second computing platform) may join a game session and/or join a game session with another user (such as the first user) specified by the game information. For example, the pointer presented by presentation component 108 may specify a game session and/or a game based on the game state defined by the game information. The pointer presented by presentation component 108 may specify a user account of a user (such as the first user) associated with and/or participating in the game session and/or game based on the user state defined by the game information.

Presentation component 108 may be configured to effectuate presentation of the depiction of the pointer concurrently with the presentation of the video content and/or other content. Presentation component 108 may be configured to effectuate presentation of the pointer concurrently with the presentation of the video content when one or more of the criteria of the set of pointer criteria are satisfied. Presentation component 108 may be configured to effectuate presentation of the pointer concurrently with the presentation of the video content when a user (e.g., the first user) enables the presentation of the pointer. Presentation component 108 may be configured to effectuate presentation of the pointer concurrently with the presentation of the video content to a user (e.g., the second user) when one or more of the criteria of the set of pointer criteria are satisfied by the user.

For example, responsive to the second user satisfying one or more of the criteria of the set of pointer criteria, presentation component 108 may be configured to effectuate presentation of pointer concurrently with the presentation of the video content on the second computing platform. In some implementations, presentation component 108 may be configured to effectuate presentation of the pointer concurrently with the presentation of the video content to the user when all of the criteria of the set of pointer criteria are satisfied by the user.

Presentation component 108 may be configured to facilitate presentation of the pointer in the video content and/or around the video content. Presentation component 108 may embed the pointer in the video content. Presentation component 108 may be configured to facilitate presentation of the pointer in the depiction of the game session of the game and/or other content in the video content. Presentation component 108 may be configured to facilitate presentation of the pointer on the depiction of the topography of the simulated physical space and/or other content in the video content. Presentation component 108 may be configured to facilitate presentation of the pointer on the depiction of the one or more virtual objects and/or other content in the video content. In some implementations, a virtual object may be the pointer.

Presentation component 108 may be configured to notify a user of the presence of the pointer. Presentation component 108 may be configured to notify a user of the presence of the pointer when the pointer may be presented. Presentation component 108 may be configured to notify the user of the presence of the pointer by effectuating presentation of a message and/or other information. The message may include a text message, an audio message, and/or other messages. The text message may be presented in the video content and/or around the video content. The text message may be presented in a chat box in the video content and/or around the video content. The message may inform the user of the presence of the pointer. The message may inform the user that they may join the game session through the pointer. The message may inform the user that they may join the game session for contemporaneous, interactive play with another user through the pointer. For example, the message may inform the second user that they may join the game session for contemporaneous, interactive play with the first user through the pointer. Presentation component 108 may be configured to notify the user of the presence of the pointer by effectuating presentation audio and/or visual content. For example, presentation component 108 may effectuate presentation of audio and/or visual content that indicates the presence of the pointer.

Input component 110 may be configured to obtain user input information defining user input and/or other information. Input component 110 may obtain the user input information from computing platform(s) 140, external resource(s) 120, and/or other devices. Input component 110 may obtain the user input information from the first computing platform, the second computing platform, and/or other computing platforms. In some implementations, input component 110 may obtain the user input information from the device associated with the computing platform(s) 140 and/or other devices. For example, the input component may obtain the user input information from the smart home device (e.g., smart speakers) and/or other devices associated with computing platform(s) 140. Input component 110 may obtain the user input information captured by the input devices and/or other devices. The user input may include one or more of a body gesture input, touch gesture input, controller input, text input, audio input, movement input, and/or other inputs.

The user input may define a user's interaction with computing platform(s) 140 and/or other devices. The user input may specify one or more user instructions for interacting with the game session, the video content, and/or other content. For example, the user input may specify instructions for controlling one or more virtual objects within the game session and/or other content. The user input may specify instructions for viewing the video content and/or other content. Instructions for viewing the video content may include starting the video content, ending the video content, pausing the video content, rewinding the video content, fast forwarding the video content, and/or other instructions for viewing the video content. The user input may specify instructions for leaving a message and/or comment on a comment section near or in the video content. The user input may specify instructions for attempting to satisfy the one or more of the set of pointer criteria, the set of game criteria, and/or other criteria.

In some implementations, the user input from the first user may include an instruction to enable the presentation of the pointer and/or other instructions. The user input from the second user may include an instruction for attempting to satisfy the set of pointer criteria, an instruction for accepting the offer to join the game session depicted in the video content, and/or other instructions. Input component 110 may obtain input information defining the first user input from the first computing platform, input information defining the second user input from the second computing platform, and/or other input information defining the other user inputs from the other computing platforms.

The user input may enable the transmission of the game session information, presentation of the pointer, and/or other information. For example, the user input from the first computing platform may enable the transmission of the game session information and/or other information. The user input from the first computing platform may enable the presentation of the pointer. The user input from the first computing platform may include an offer for the second computing platform to join the game session.

The user input from the computing platform(s) 140 may include instructions to control the one or more virtual objects in the game session. For example, the user input may include instructions to move the one or more virtual objects from a first location to a second location within the topography of the simulated physical space and/or perform other actions. The user input may include instructions to control the one or more virtual objects in the game session in an attempt to satisfy the set of game criteria.

The user input may include one or more attempts to satisfy one or more criteria of the set of pointer criteria. For example, the user input from the second computing platform may include one or more attempts to satisfy one or more criteria of the set of pointer criteria. For example, a criterion of the set of pointer criteria may require a text input and/or other inputs. The user input from the second computing platform may provide the text input and/or the other inputs. The user input may include instructions for accepting the offer from the pointer to participate in the game session. For example, the user input from the second computing platform may include instructions to acceptance of the offer from the pointer to participate in the game session A user input may comprise one or more of a body gesture input received through the imaging device, motion capture device, and/or other devices/sensors of computing platform(s) 140, one or more of a touch gesture input received through touch-enabled input device (e.g., a touch screen) of computing platform(s) 140, one or more of a controller input received through input device (e.g., a mouse, a keyboard, and/or a game controller) of computing platform(s) 140, an audio input received through an audio sensor of computing platform(s) 140, and/or other inputs received through other devices.

The body gesture input may include information defining movement of a body part of the user, including movement of a hand, arm, leg, and/or other body parts of the user. The body gesture input may specify one or more selections of the virtual objects within the topography of the simulated physical space. The body gesture input may define a user's interaction with computing platform(s) 140.

In some implementations, the user's body gesture input may be interpreted from video content through image-processing techniques, computer vision techniques, and/or other techniques. In some implementations, the image-processing techniques may include one or more of a bundle adjustment, SURF (Speeded-Up Robust Features), ORB (Oriented FAST and rotated BRIEF), computer vision, and/or other techniques. The computer vision techniques may include one or more recognition techniques, motion analysis techniques, image restoration techniques, and/or other techniques.

The touch gesture input may include information defining one or more movements. The movements may include one or more of a finger press, a finger tap, a finger swipe, a finger flick, a finger drag, a pinch, a touch-and-hold, a scroll, and/or other finger movements. These movements may similarly be carried out using a tool, such as a stylus. The touch gesture input may specify one or more selections of the virtual objects within the topography of the simulated physical space. The touch gesture input may draw one or more images and/or trace one or more lines on the simulated physical space. The touch gesture input may define a user's interaction with computing platform(s) 140.

The controller input may include information defining one or more of a key/button pressing input, a key/button tapping input, a swiping input, a flick input, a drag input, a key/button press-and-hold input, a scroll input, and/or other inputs from a controller. The controller input may include one or more of a movement of a mouse, a movement of a mouse while holding a button on the mouse, a press of one or more keys of a keyboard, a movement of a joystick, a movement of a joystick while holding of a button on a controller, and/or other controller inputs. The controller input may specify one or more selections of the virtual objects within the topography of the simulated physical space. The controller input may define a user's interaction with computing platform(s) 140.

In some implementations, the text input may be obtained from a keyboard, a voice recognition device, and/or other devices. The text input may include one or more words in one or more languages. The one or more words may form one or more sentences in one or more languages.

The audio input may include information defining audio signals of a user. The audio signal of the user may be captured by a microphone and/or other audio capture devices. The audio signals from the user may be a voice command. In some implementations, instructions may be associated with the voice commands. The audio input may include the user singing a song, speaking one or more words, and/or other audio inputs. The audio input may have one or more of an audio duration defining a length of the audio input, an audio level defining a volume of the audio input, and/or other audio features. The association between the instructions and the voice command may be predetermined. The association between the instructions and the voice command may be determined by one or more machine learning techniques and/or other techniques.

The movement input may include information defining movements of computing platform(s) 140 and/or other devices. The movements may include a shaking movement, a projection movement, a rotation movement, and/or other movements. The shaking movement may include a user shaking computing platform(s) 140 and/or other devices. The projection movement may include a user throwing, tossing, and/or dropping computing platform(s) 140 and/or other devices. The rotation movement may include a user rotating computing platform(s) 140 and/or other devices about one or more axes. The movement input may be captured by one or more inertial measurement units, gyroscopes, and/or other motion sensing devices.

Determination component 112 may be configured to determine whether the set of pointer criteria has been satisfied. Determination component 112 may be configured to determine whether the one or more criteria of the set of pointer criteria has been satisfied based on the user information, the user input information, and/or other information.

Determination component 112 may determine the one or more criteria of the set of pointer criteria satisfied based on the user information. The one or more criteria of the set of pointer criteria may require the user to participating in one or more activities and/or perform one or more actions. Determination component 112 may identify whether the user has participated in one or more activities and/or performed one or more actions. The identification may be based on analyzing user information and/or other information of the user. Responsive to identifying that the user has participated in one or more activities and/or perform one or more actions, determination component 112 may determine that the criteria of the set of pointer criteria may be satisfied.

For example, criteria of the set of pointer criteria may require a user to make a subscription purchase and/or perform other actions. Determination component 112 may identify whether the user has made the subscription purchase and/or performed the other actions from user information of the user. Responsive to identifying that the user has made the subscription purchase and/or performed the other actions from the user information, determination component 112 may determine that the criteria of the set of pointer criteria may be satisfied. The one or more criteria of the set of pointer criteria may require a user to have a membership and/or registered account. Determination component 112 may identify the membership and/or registered account from the user information. Responsive to the determination component 112 identifying the membership and/or registered account from the user information, determination component 112 may determine that the criterion of the set of pointer criteria may be satisfied.

Determination component 112 may determine whether the user input defined by the user input information satisfies the one or more criteria of the set of pointer criteria. Determination component 112 may be configured to identify a user input based on the user input information and/or other information. Based on the identified user input, determination component 112 may determine that the criteria of the set of pointer criteria may be satisfied. For example, criteria of the set of pointer criteria may require a user to input a name in a text box and/or provide other inputs, responsive to determination component 112 identifying that the user provided user input the text box and/or provide the other inputs, determination component 112 may determine that the criteria of the set of pointer criteria may be satisfied.

Determination component 112 may determine whether the user input satisfies the one or more criteria of the set of pointer criteria by comparing the user input with the one or more criteria of the set of pointer criteria. If a user input matches a criterion from the set of pointer criteria, determination component 112 may determine that the criterion from the set of pointer criteria may be satisfied. If all the criteria from the set of pointer criteria have been satisfied, determination component 112 may determine that the set of pointer criteria has been satisfied.

Determination component 112 may determine whether the one or more criteria of the set of pointer criteria based on occurrences within the real-world and/or the virtual world. Determination component 112 may be configured to obtain information defining occurrences within the real-world and/or virtual-world from computing platform(s) 140, external resource(s) 120, and/or other devices. In some implementations, a criterion of the set of pointer criteria may require an occurrence of an event within the real-world and/or the virtual world. Responsive to the determination component 112 obtaining information defining the occurrence of the event within the real-world and/or the virtual world, determination component 112 may determine that the criterion of the set of pointer criteria may be satisfied.

Effectuation component 114 may be configured to facilitate execution of an instance of the game session on computing platform(s) 140. Effectuation component 114 may be configured to facilitate execution of the instance of the game on computing platform(s) 140 (such as the second computing platform) by providing computing platform(s) 140 with pointer information and/or other information. Effectuation component 114 may provide computing platform(s) 140 with the pointer information associated with the pointer presented concurrently with the video content. The pointer information may enable computing platform(s) 140 to execute the instance of the game. The pointer information including information defining the game state and user state that may enable computing platform(s) 140 to execute the instance of the game.

For example, effectuation component 114 may be configured to facilitate execution of an instance of the game session on the second computing platform such that the second user may participate in the game session with the first user. The instance of the game session presented on the second computing platform may be the instance of the game session presented on the first computing platform. For example, the instance of the game session executed on the second computing platform may be the same game session as executed on the first computing platform. The instance of the game session executed on the second computing platform may be hosted on the same game server as the game session as executed on the first computing platform. In some implementations, effectuation component 114 may be configured to facilitate execution of an instance of a copy of the game session on the first computing platform on the second computing platform such that the second user may participate in the copy of the game session. The copy of the game session presented on the second computing platform may be a different instance of the game session presented on the first computing platform. For example, the copy of the game session may include video objects in the same or similar location as the original game session, a same or similar simulated physical space as the original game session, a same or similar number of number of criteria in the set of game criteria satisfied as the original game session, a same or similar level in the game session as the original game session, and/or other similarities as the original game session. The copy of the game session may be hosted on a different game server compared to the original game session. In some implementations, effectuation component 114 may be configured to facilitate execution of an instance of a different game session of the game on the second computing platform such that the second user may participate in the different game session of the game. For example, effectuation component 114 may be configured to facilitate execution of the same game on the second computing platform as the first computing platform, but in a different game session. For example, effectuation component 114 may be configured to facilitate execution of a chess game on the second computing platform and the first computing platform, but different chess matches on the second computing platform and the first computing platform. The game session executed on the second computing platform and the first computing platform may be hosted on different game servers and/or the same game server.

Effectuation component 114 may be configured to facilitate execution of the instance of the game on computing platform(s) 140 when the user (such as the second user) of computing platform(s) 140 (such as the second computing platforms) accepts the offer included with the presentation of the pointer. Effectuation component 114 may be configured to facilitate execution of the instance of the game on computing platform(s) 140 such that the user of computing platform(s) 140 may participate in the game session specified by the pointer.

For example, responsive to the second user accepting the offer presented by the pointer, effectuation component 114 may be configured to facilitate execution of the instance of the game session on the second computing platform. The instance of the game session on the second computing platform may enable the second user to join the game session of the game for contemporaneous, interactive play with the first user.

In some implementations, effectuation component 114 may be configured to obtain approval from a user (such as the first user) participating in the game session prior to the execution of the instance of the game on computing platform(s) 140 (such as the second computing platform). For example, effectuation component 114 may be configured to obtain approval from the first user participating in the game session prior to the execution of the instance of the game on the second computing platform such that the second user may join the game session of the game for contemporaneous, interactive play with the first user.

In some implementations, server(s) 102, computing platform(s) 140, and/or external resource(s) 120 may be operatively linked via one or more electronic communication links. For example, such electronic communication links may be established, at least in part, via a network 103 such as the Internet and/or other networks. It will be appreciated that this is not intended to be limiting, and that the scope of this disclosure may include implementations in which server(s) 102, computing platform(s) 140, and/or external resource(s) 120 may be operatively linked via some other communication media.

In some implementations, external resource(s) 120 may include sources of information, hosts and/or providers of virtual environments outside of system 100, external entities participating with system 100, and/or other resources. In some implementations, some or all of the functionality attributed herein to external resource(s) 120 may be provided by resources included in system 100.

In some implementations, Server(s) 102 may include electronic storage(s) 122, processor(s) 124, and/or other components. Server(s) 102 may include communication lines or ports to enable the exchange of information with a network and/or other computing devices. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing devices operating together as server(s) 102.

In some implementations, electronic storage(s) 122 may include electronic storage media that electronically stores information. The electronic storage media of electronic storage(s) 122 may include one or both of system storage that is provided integrally (i.e., substantially nonremovable) with server(s) 102 and/or removable storage that is removably connectable to server(s) 102 via, for example, a port (e.g., a USB port, a firewire port, etc.) or a drive (e.g., a disk drive, etc.). Electronic storage(s) 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage(s) 122 may include one or more virtual storage resources (e.g., cloud storage, a virtual private network, and/or other virtual storage resources). Electronic storage(s) 122 may store software algorithms, information determined by processor(s) 124, information received from server(s) 102, information received from computing platform(s) 140, and/or other information that enables server(s) 102 to function as described herein.

In some implementations, processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same computing platform, or processor(s) 124 may represent processing functionality of a plurality of devices operating in coordination. The processor(s) 124 may be configured to execute computer-readable instruction components 106, 108, 110, 112, 114, and/or other components. The processor(s) 124 may be configured to execute components 106, 108, 110,112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 may include multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 2:
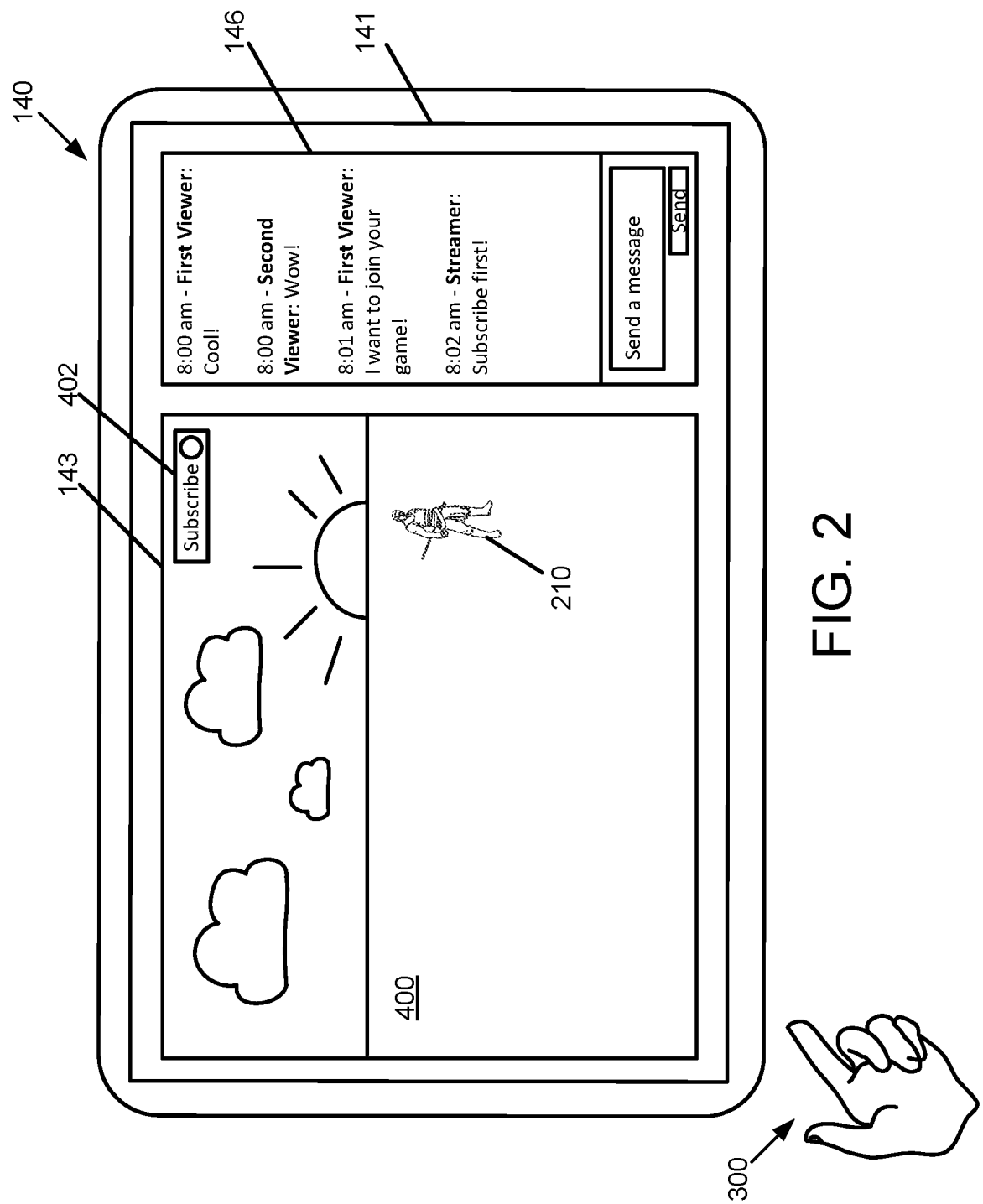
FIG. 2 illustrates a depiction of a viewer watching a live video content of gameplay of a game session on a computing platform associated with the viewer, in accordance with one or more implementations.

As is illustrated in FIG. 2 depicts of a viewer 300 (e.g., the second user) watching a live stream video 141 of gameplay of a game session 143 on computing platform(s) 140. Live stream video 141 may include a chat box 146 where viewers may have a conversation with one another and/or for game session 143 to communicate information to the viewers. Game session 143 may include a virtual entity 210 associated with a user broadcasting live stream video 141, a virtual object 402, and/or other content. Viewer 300 may interact (e.g., select) virtual object 402 to subscribe to live stream video 141. Virtual entity 210 may be positioned within a topography of simulated physical space 400. Viewer 300 may participate in game session 143 with the user broadcasting live stream video 141. A subscription to live stream video 141 may be required for viewer 300 to be enabled to participate in game session 143 with the user broadcasting live stream video 141.

Figure 3:
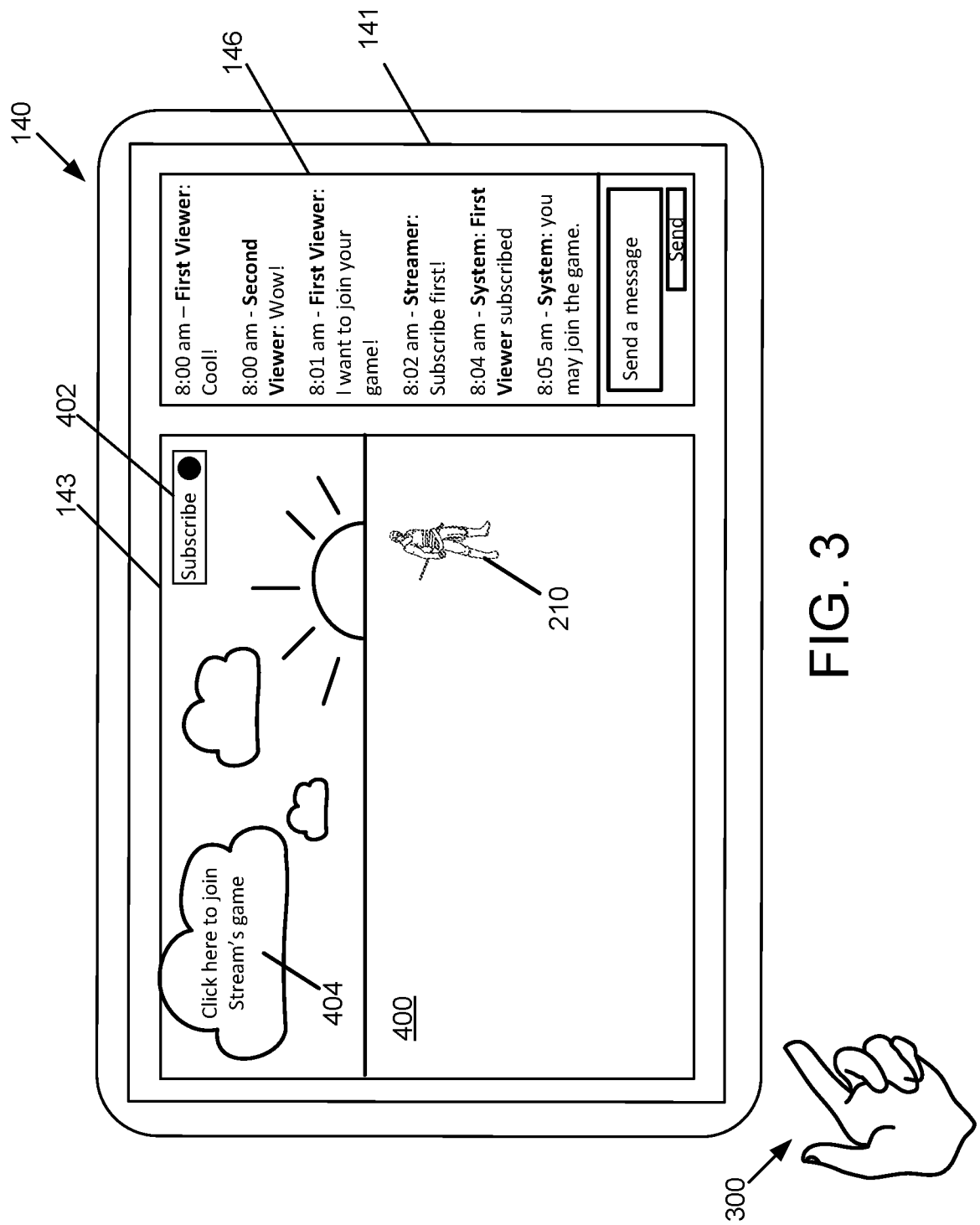
FIG. 3 illustrates a depiction a presentation of a pointer in the live video content on the computing platform, the pointer may present an offer for the viewer to join the game session presented on the live video content, in accordance with one or more implementations.

As is illustrated in FIG. 3 depicts viewer 300 subscribing to live stream video 141 by interacting with virtual object 402. Responsive to viewer 300 subscribing to live stream video 141, a pointer 404 is presented concurrently with live stream video 141. Pointer 404 may be a virtual object in the game session. Viewer 300 may interact (e.g., select) pointer 404 to join the game session for contemporaneous, interactive play with the user broadcasting live stream video 141.

Figure 4:
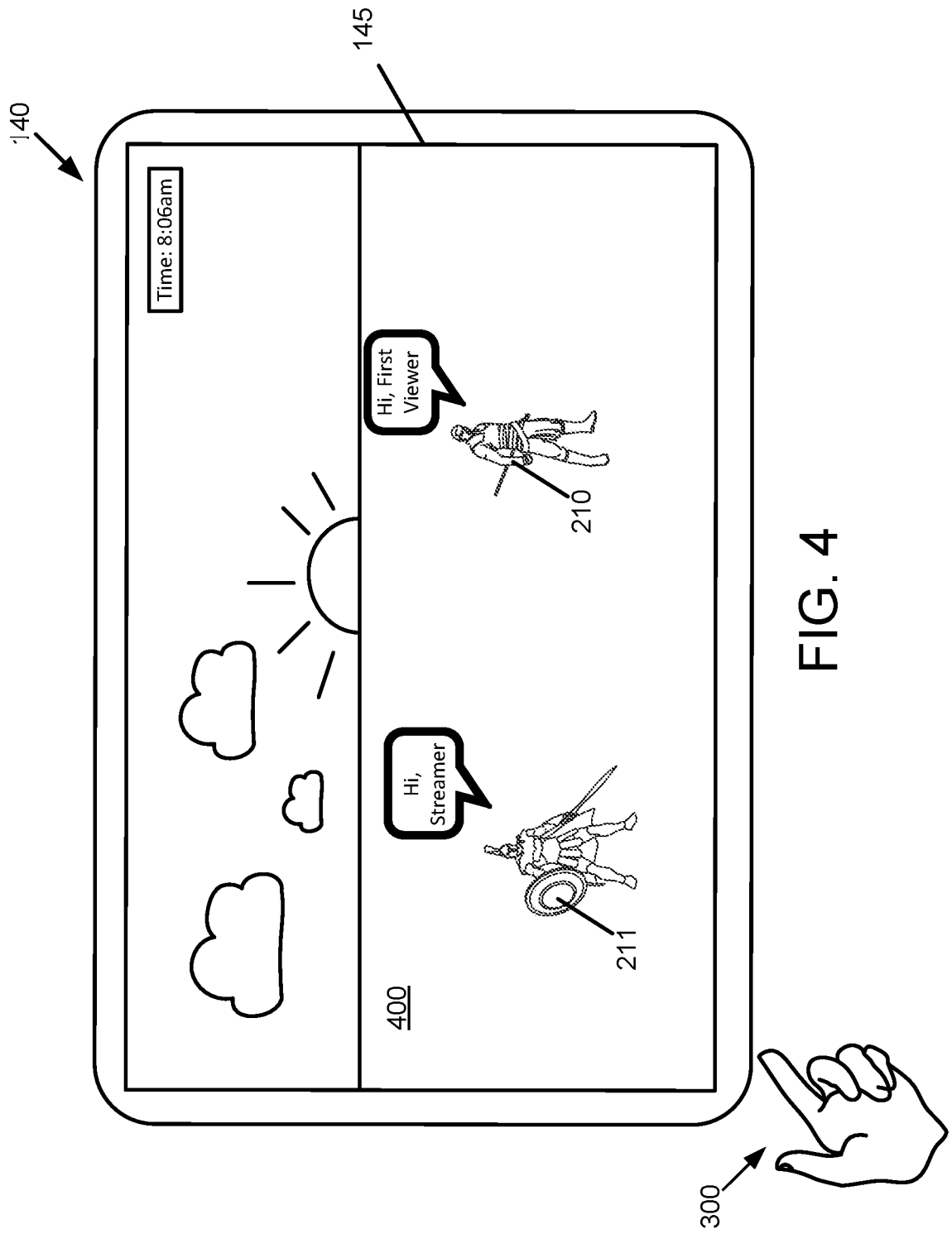
FIG. 4 illustrates a depiction of the viewer joining in the game session depicted in the live video content, in accordance with one or more implementations.

As is illustrated in FIG. 4 depicts viewer 300 joining in the game session for contemporaneous, interactive play with the user broadcasting live stream video 141. An instance of game session 145 may be presented on computing platform(s) 140. A virtual entity 211 may be presented on simulated physical space 400. Virtual entity 211 may be associated with viewer 300. Viewer 300 may control virtual entity 211 in the game session 145. Virtual entity 211 may interact with virtual entity 210 for contemporaneous, interactive play with the user broadcasting live stream video 141.

Figure 5:
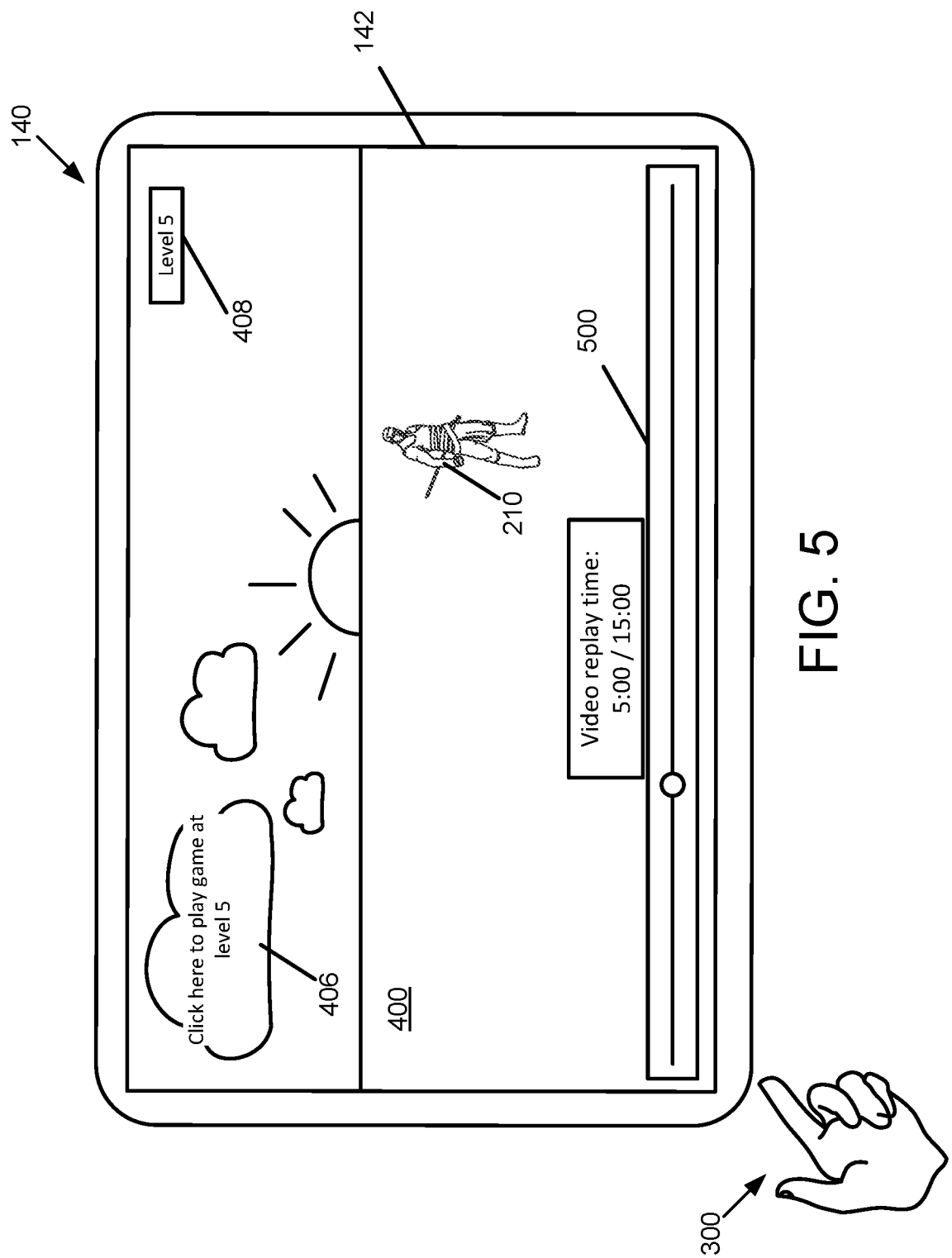
FIG. 5 illustrates a depiction of a presentation of a pointer in a video recording on the computing platform, the pointer may present an offer for the viewer to join the game session presented on the live video content, in accordance with one or more implementations.
Figure 6:
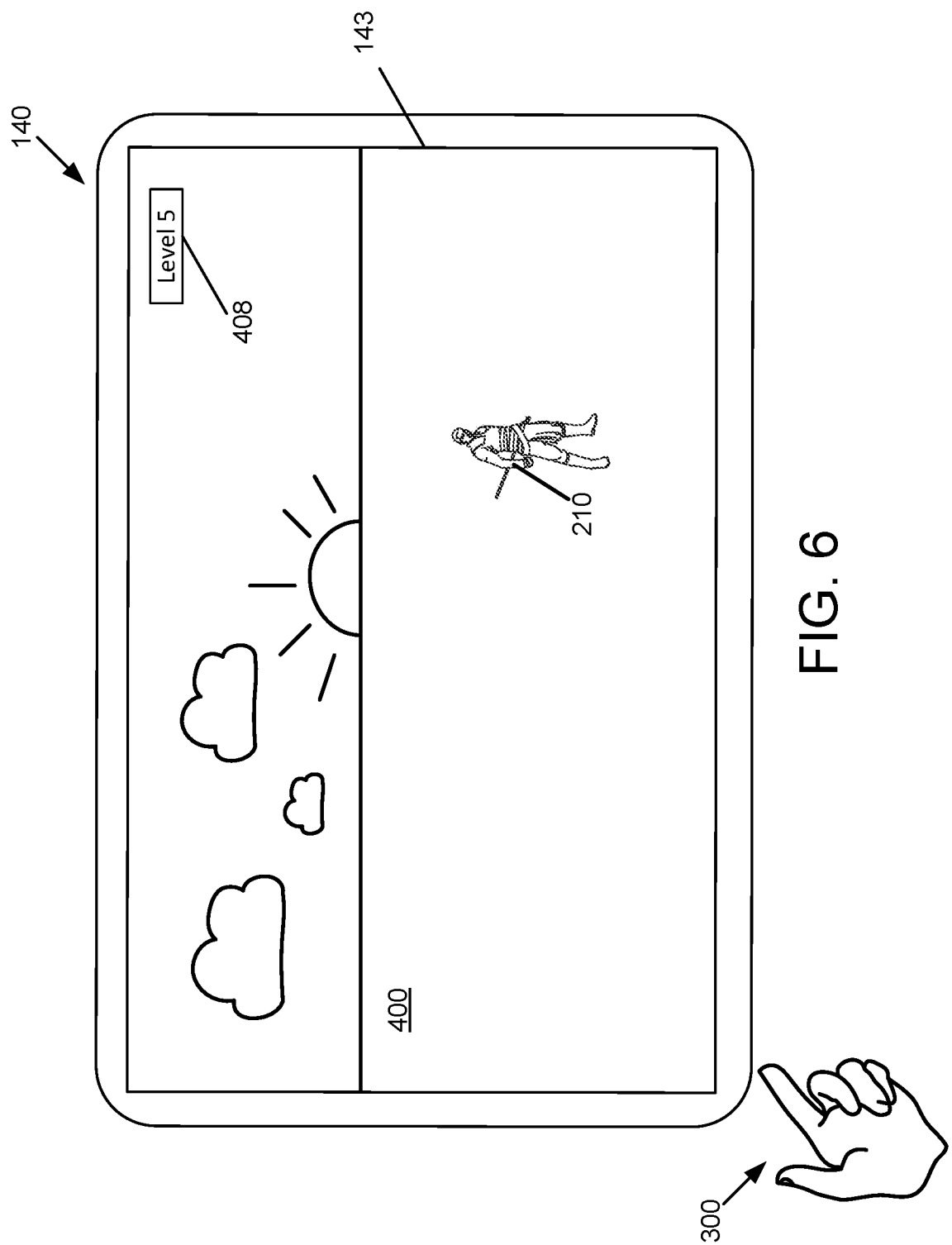
FIG. 6 illustrates a depiction of the viewer joining in the game session depicted in the video recording, in accordance with one or more implementations.

As is illustrated in FIG. 5, depicts viewer 300 viewing a recording 142 of game session 145. Recording 142 may include a progress length 500. Progress length 500 may indicate a duration of recording 142. Viewer 300 may determine when to start viewing recording 142 based on progress length 500. For example, progress length 500 of recording 142 may have a duration of 15 minutes. Viewer 300 may choose to start viewing recording 142 5 minutes into recording 142. Progress length 500 may be associated with a game progress of game session 145. For example, 5 minutes into recording 142, game session 145 may be at a level 408 of game session 145. A pointer 406 may be presented concurrently with recording 142. Viewer 300 may interact with pointer 406 to join a game session 143 (as depicted in FIG. 6) at level 408. Game session 143 may be a copy of game session 145. For example, responsive to viewer 300 interacting with pointer 406, an instance of game session 143 may be presented on computing platform(s) 140 such that viewer 300 may participate in the copy of game session 145 at level 408.

As is illustrated in FIG. 6 depicts the instance of game session 143 presented on computing platform(s) 140. Game session 143 may be a copy of game session 145 at level 408. Viewer 300 may participate in game session 143 by controlling virtual entity 210.

Figure 7:
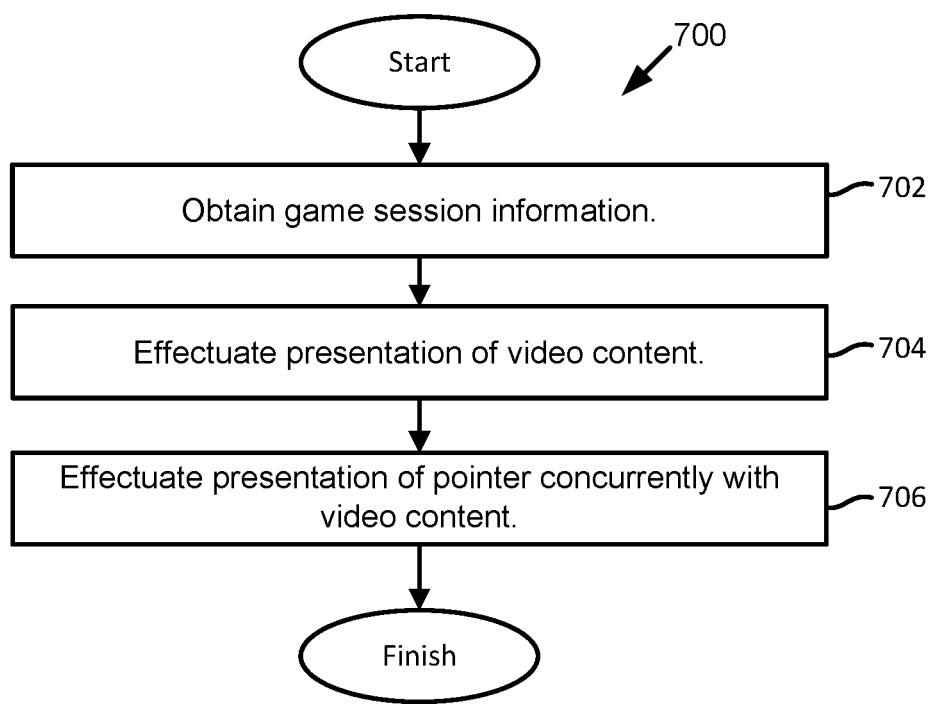
FIG. 7 illustrates a method configured to facilitate users joining an ongoing game depicted in video content, in accordance with one or more implementations.

FIG. 7 illustrates the method 700, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below are not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, game session information may be obtained. The game session information may include video information that defines video content, a pointer, and/or other information. The video content may depict gameplay of a first user participating in a game session of the game. The pointer may be associated with a game state and a user state of the game session such that the pointer facilitates a second user to join the game session of the game for contemporaneous, interactive play with the first user. In some embodiments, operation 702 is performed by a broadcasting component the same as or similar to broadcasting component 106 (shown in FIG. 1 and described herein).

At an operation 704, presentation of the video content on a display of a computing platform associated with the second user may be effectuated. In some embodiments, operation 704 is performed by a presentation component the same as or similar to presentation component 108 (shown in FIG. 1 and described herein).

At an operation 706, presentation of the pointer concurrently with the video content presented on the display of the computing platform may be effectuated. The pointer may be presented within the video content such that the second user associated with the computing platform is enabled to select the pointer to join the game session for contemporaneous, interactive play with the first user. In some embodiments, operation 706 is performed by the presentation component, an input component, a determination component, and an effectuation component the same as or similar to presentation component 108, input component 110, determination component 112, and effectuation component 114 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed is:

1. A system configured to facilitate players joining an ongoing online game, the system comprising:
    one or more physical processors configured by machine-readable instructions to:
        obtain game session information, the game session information including (i) video information that defines video content, and (ii) a pointer, the video content depicting gameplay of a first user participating in a game session of the game, the first user participation including gameplay in a first game activity in the game session, the pointer being associated with a game state and a user state of the game session such that the pointer facilitates a second user to join the game session of the game for contemporaneous, interactive play with the first user;
        effectuate presentation of the video content on a display of a computing platform associated with the second user;
        effectuate presentation of the pointer concurrently with the video content presented on the display of the computing platform, the pointer being presented within the video content such that the second user associated with the computing platform is enabled to select the pointer to join the game session for the contemporaneous, interactive play with the first user, wherein the second user joining the game session for the contemporaneous, interactive play with the first user comprises the computing platform of the second user establishing communication with a game server hosting the game session to facilitate cooperative participation in the first game activity of the game session with the first user contemporaneously in time with the selection of the pointer;
        wherein the pointer has a set of pointer criteria for determining when the pointer is presented concurrently with the video content, wherein the pointer is presented concurrently with the video content responsive to the set of pointer criteria being satisfied; and
        wherein the set of pointer criteria includes criteria requiring a payment of a fee to make a purchase of an item.

2. The system of claim 1, wherein the video content depicting gameplay of the first user participating in the game session of the game includes a depiction of one or more virtual objects positioned within the topography of a simulated physical space of the game in accordance with the game session, and the first user participating in the game session using a first game entity controlled by the first user.

3. The system of claim 1, wherein the game state defines one or more of a set of game criteria for completing the game session, one or more game criteria satisfied, one or more game behaviors, a game appearance, and/or a game progress; and the user state defines one or more of a user account, a user game status, and/or a user location.

4. The system of claim 1, wherein the pointer presented in the video content includes a depiction of a graphical user interface including one or more of a hyperlink and/or a widget that facilitates the execution of an instance of the game on the computing platform.

5. The system of claim 1, wherein the video content is a real-time or near real-time recording of the game session played by the first user, and the pointer is associated with the real-time or near real-time recording of the game session.

6. The system of claim 1, wherein the pointer is presented concurrently with the video content and includes an offer for the second user to join the game session of the game for the contemporaneous, interactive play with the first user, and in response to the second user accepting the offer, the computing platform executes an instance of the game using the game state and the user state.

7. The system of claim 6, wherein the one or more physical processors are further configured by the machine-readable instructions to responsive to the second user accepting the offer, obtain approval from the first user for the second user to join the game session of the game for the contemporaneous, interactive play with the first user prior to enabling the computing platform to execute the instance of the game.

8. The system of claim 1, wherein the set of pointer criteria further includes criteria requiring one or more of the second user viewing the video content for a duration of time, the second user watching an advertisement, the second user making a comment in a chat box, or the second user completing a survey.

9. A method configured to facilitate players joining an ongoing, online game, the method comprising:
    obtaining game session information, the game session information including (i) video information that defines video content, and (ii) a pointer, the video content depicting gameplay of a first user participating in a game session of the game, the first user participation including gameplay in a first game activity in the game session, the pointer being associated with a game state and a user state of the game session such that the pointer facilitates a second user to join the game session of the game for contemporaneous, interactive play with the first user;

effectuating presentation of the video content on a display of a computing platform associated with the second user;

effectuating presentation of the pointer concurrently with the video content presented on the display of the computing platform, the pointer being presented within the video content such that the second user associated with the computing platform is enabled to select the pointer to join the game session for the contemporaneous, interactive play with the first user, wherein the second user joining the game session for the contemporaneous, interactive play with the first user comprises the computing platform of the second user establishing communication with a game server hosting the game session to facilitate cooperative participation in the first game activity of the game session with the first user contemporaneously in time with the selection of the pointer;

wherein the pointer has a set of pointer criteria for determining when the pointer is presented concurrently with the video content, wherein the pointer is presented concurrently with the video content responsive to the set of pointer criteria being satisfied; and wherein the set of pointer criteria includes criteria requiring a payment of a fee to make a purchase of an item.

10. The method of claim 9, wherein the video content depicting gameplay of the first user participating in game session of the game includes a depiction of one or more virtual objects positioned within the topography of a simulated physical space of the game in accordance with the game session, and the first user participating in the game session using a first game entity controlled by the first user.

11. The method of claim 9, wherein the game state defines one or more of a set of game criteria for completing the game session, one or more game criteria satisfied, one or more game behaviors, a game appearance, and/or a game progress; and the user state defines one or more of a user account, a user game status, and/or a user location.

12. The method of claim 9, wherein the pointer presented in the video content includes a depiction of a graphical user interface including one or more of a hyperlink and/or widget that facilitates the execution of an instance of the game on the computing platform.

13. The method of claim 9, wherein the video content is a real-time or near real-time recording of the game session played by the first user, and the pointer is associated with the real-time or near real-time recording of the game session.

14. The method of claim 9, wherein the pointer is presented concurrently with the video content and includes an offer for the second user to join the game session of the game for the contemporaneous, interactive play with the first user, and in response to the second user accepting the offer, the computing platform executes an instance of the game using the game state and the user state.

15. The method of claim 14, wherein responsive to the second user accepting the offer, obtain approval from the first user for the second user to join the game session of the game for the contemporaneous, interactive play with the first user prior to enabling the computing platform to execute the instance of the game.

16. The method of claim 9, wherein the set of pointer criteria further includes criteria requiring one or more of the second user viewing the video content for a duration of time, the second user watching an advertisement, the second user making a comment in a chat box, or the second user completing a survey.

* * * * *